Jan. 30, 1945. C. Z. MONROE 2,368,483
CONVEYER
Filed Dec. 14, 1942 3 Sheets-Sheet 1
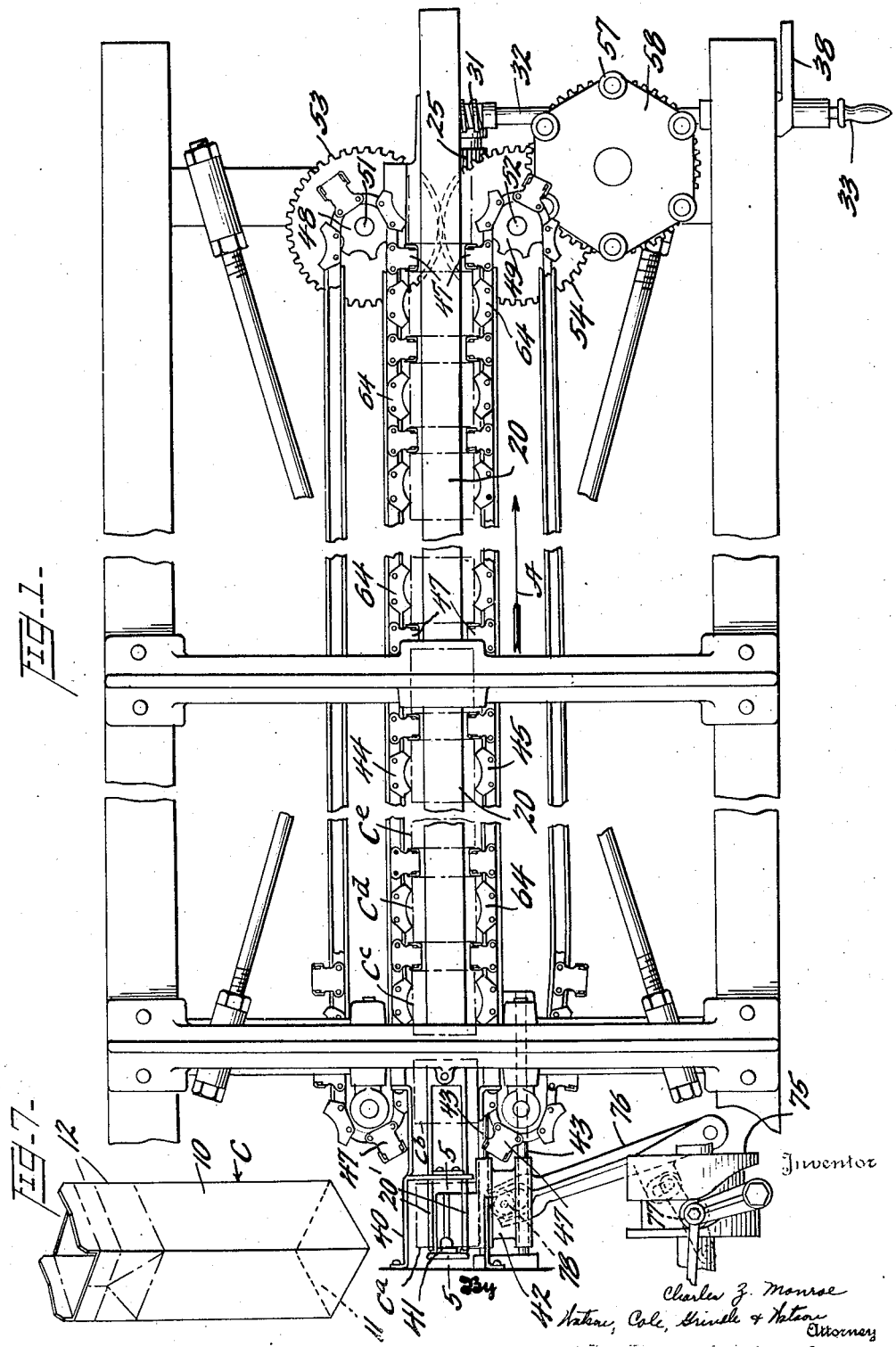

Jan. 30, 1945.   C. Z. MONROE   2,368,483
CONVEYER
Filed Dec. 14, 1942   3 Sheets-Sheet 2
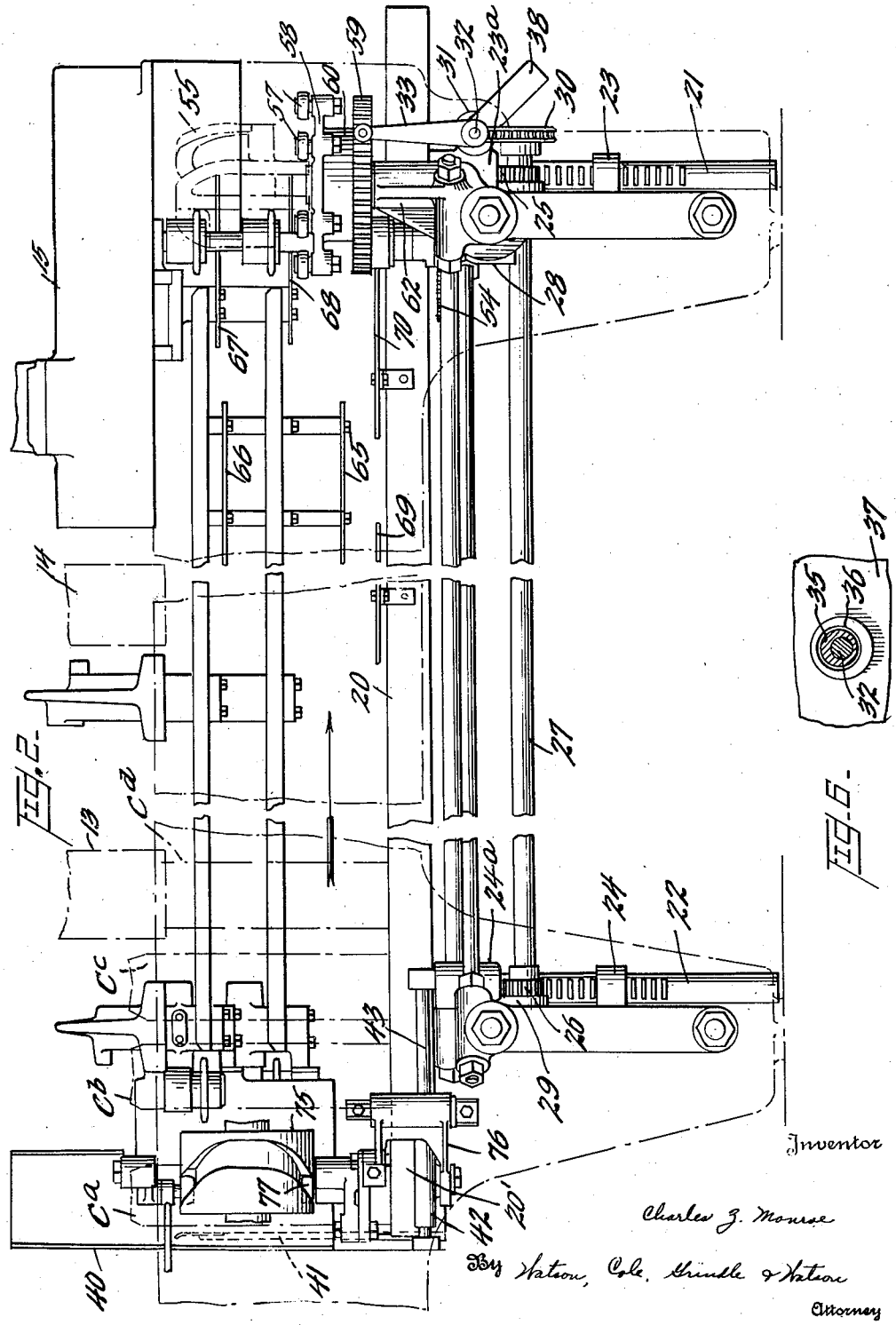

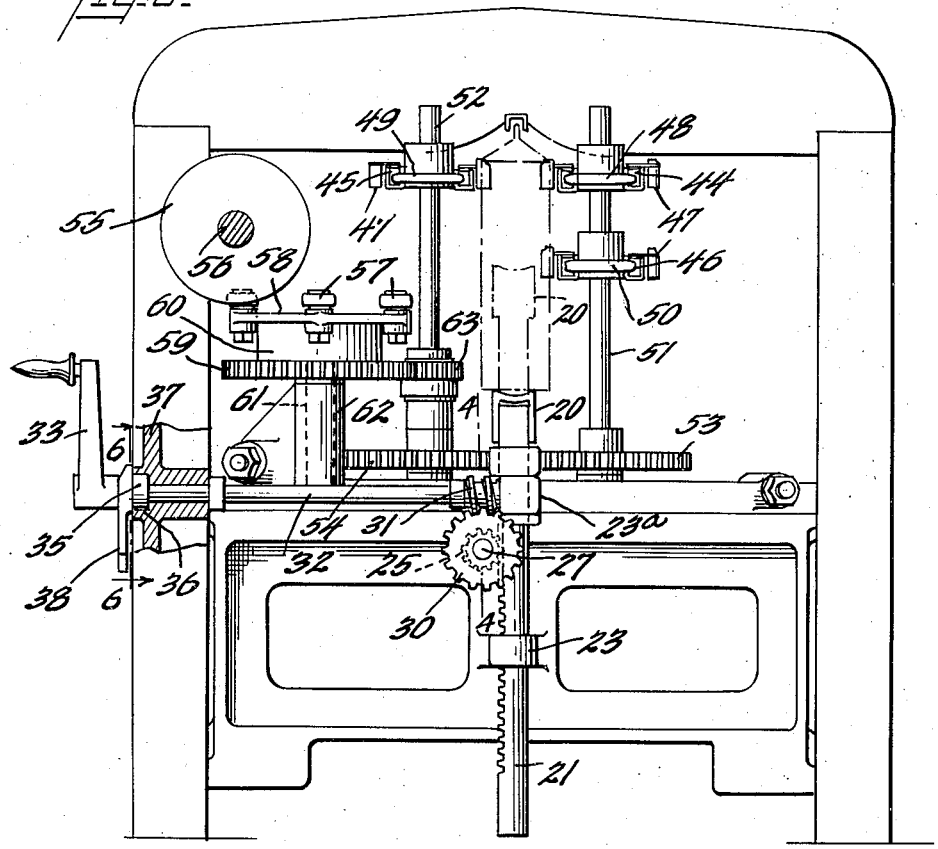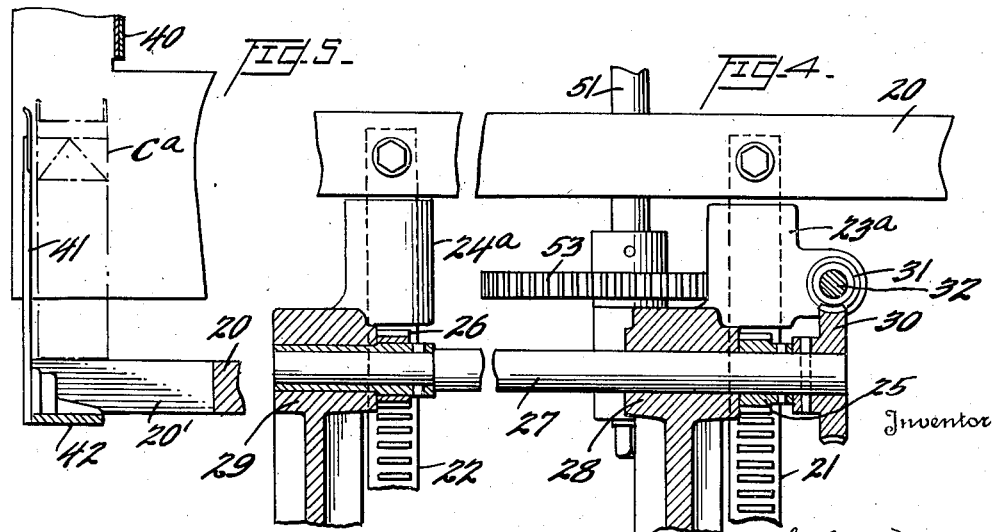

Patented Jan. 30, 1945

2,368,483

UNITED STATES PATENT OFFICE 2,368,483

CONVEYER

Charles Z. Monroe, Detroit, Mich., assignor to The American Paper Bottle Company, Toledo, Ohio, a corporation of Ohio Application December 14, 1942, Serial No. 468,966

2 Claims. (Cl. 198—164)

This invention relates to machines for fabricating containers and particularly to machines for fabricating tubular paper containers of the type disclosed in Patent No. 2,047,891, issued July 14, 1936, in the name of Henry T. Scott.

The paper container disclosed in the patent just above identified is of tubular type, square in horizontal section, with a flat bottom and a top closure which comprises a plurality of relatively folded panels, the terminal panels being gathered together in a central transverse rib. The paper of which the container is fabricated is relatively stiff and the container is well suited for the reception, transportation, and dispensing of liquids in the event that it is coated with a satisfactory grade of liquid-proofing substance such as paraffin, the container as a whole being rigid and self-supporting even when subjected to the rather substantial pressure of the liquid from within, and during transportation and handling.

While containers of the type referred to may be fabricated by hand, it is preferable to provide apparatus for their automatic fabrication since in this manner the packaging of liquids is greatly facilitated, uniformity of product insured and the manufacture, charging and sealing of containers may proceed under the most sanitary conditions, a factor of the greatest importance in the packaging of foodstuffs, particularly liquids such as milk. A complete automatic mechanism for the fabrication, charging, closing, and sealing of containers of the type referred to, which mechanism has heretofore been employed with eminent success, has included a plurality of stationary devices for successively charging, closing and sealing containers moving along a predetermined pathway, together with a conveyer for advancing containers along such pathway in order that they may be successively acted upon by said devices.

A mechanism of the general type referred to is disclosed in Patent No. 2,085,477, issued June 29, 1937, in the name of Henry T. Scott, and the present invention comprises an improvement upon the container fabricating machine disclosed in that patent. In the patented structure means is provided for gripping the base of each container introduced into the machine and maintaining such grip during the time that the upper end of the container is being acted upon by the several instrumentalities positioned above the conveyer. The present invention contemplates the use of a simple support for the series of containers successively moving through the apparatus, the base of each container resting upon the elongated slide, support or trackway and pusher means, entirely separate from the support, being utilized for advancing the containers, the pusher means being so positioned that the container advancing pressure is exerted on the container over an area of its rear panel closely adjacent its upper end, where pressure is most needed in order to advance the container through the container top-closing mechanism comprising a series of stationary cams for effecting the folding of the relatively foldable top panels of the container. The elongated container supporting members are supported so as to be vertically adjustable in order that containers of various heights and capacities can be passed through the machine without requiring any major change, a feature of considerable importance. Means associated with the conveyer is so designed that it can successively place on the supporting member or slide, bottom end lowermost, empty containers of various heights, quite regardless of the vertical positioning of such member. As a result it is easily possible for the operator of the machine to adjust the machine for the production of filled pint containers, half pint containers, or quart containers, within a few seconds, the quart container differing from the containers of less capacity only in height and the only adjustment which need be made being to move the container supporting member of the conveyer vertically.

The mechanism of the present invention has a number of practical features of advantage over that disclosed in the Scott patent mentioned, all of which will be hereinafter more particularly described.

In the drawings:

Figure 1 is a plan view, partially broken away, of the improved conveyer mechanism;

Figure 2 is a side elevation of the same;

Figure 3 is an end view of the conveyer, partially broken away to show, more clearly, certain operating elements;

Figure 4 is a section on line 4—4 of Figure 3, portions of certain elements being omitted in order that the remaining elements may be shown on a larger scale;

Figure 5 is a section on line 5—5 of Figure 1;

Figure 6 is a section on line 6—6 of Figure 3; and

Figure 7 is a perspective view of one of the paper containers which the conveyer is primarily intended to receive and to advance past instrumentalities for charging and closing the same.

The container C of Figure 7 is, as previously stated, of the type disclosed in the patent to Scott, No. 2,047,891, comprising a body portion 10, a flat bottom portion 11 and a foldable top 12 comprising a plurality of panels defined and hingedly connected by intermediate scored portions. By varying the height of the body portion 10 of the container its cubic capacity may be altered as desired, the bottom construction 11 remaining the same, and likewise the foldable upper end. The conveyer which comprises the subject matter of the invention is readily adjustable to accommodate containers of different heights and cubic capacities, so that the several instrumentalities for charging the containers, and closing and sealing its foldable upper end, need not at any time be moved or adjusted.

In Figure 2 of the drawings several such instrumentalities for charging and subsequently closing and sealing the upper ends of successively presented containers are diagrammatically indicated at 13, 14, and 15, respectively. It will be understood that the details of construction of each of these several devices may vary widely, the conveyer which comprises the subject matter of this invention being adapted to cooperate with numerous types of container charging, top closing and sealing mechanisms. For that reason the details of these mechanisms are not disclosed.

The elongated vertically adjustable container supporting member of the conveyer is indicated at 20 and a series of containers the bottoms of which rest upon this supporting member are indicated at $C^a$, $C^b$, $C^d$, etc., the conveyer advancing these containers in the direction of the arrow A (Figures 1 and 2) in its operation, empty containers being dropped onto the conveyer at the left-hand end (Figures 1 and 2), and fully charged, closed, and sealed containers being delivered at the right-hand end of the conveyer, as seen in these views. The elongated container support 20 is mounted upon the upper ends of two vertically disposed racks 21 and 22, respectively, these racks being suitably guided in lower guides 23 and 24 and by upper guides 23a and 24a, these guides being rigidly supported upon the frame of the machine. The frame of the machine is indicated in dotted lines but, inasmuch as it may be varied widely in its details of construction, will not be described in detail. The teeth of each of racks 21 and 22 are in constant mesh with the teeth of associated pinions 25 and 26, respectively, these pinions being fixed upon a horizontally disposed shaft 27 mounted in bearings 28 and 29 which comprise portions of transversely extending portions of the machine frame.

Rotation of shaft 24, therefore, effects simultaneous vertical adjustment of racks 21 and 22 and vertical adjustment of the container support 20, the container support remaining horizontal at all times, however, regardless of its position of adjustment. Means is provided for rotating shaft 27 and vertically adjusting member 20 as desired, and locking member 20 in any position to which it may be adjusted, this mechanism being shown clearly in Figures 2, 3 and 4. Fixed upon the end of shaft 27 is a wormwheel 30 the teeth of which are in constant mesh with the teeth of a worm 31 fixed upon the inner end of a horizontally extending shaft 32. Upon the outer end of shaft 32 is mounted a crank or handle 33 by means of which the shaft may be readily rotated, so that vertical movement of the container supporting member 20 is easily effected. After adjustment is effected through the worm and wormwheel the container supporting member 20 will be automatically locked be-cause this gearing is irreversible, but additional means for preventing accidental adjustment is provided, this means comprising the locking device shown in Figures 2, 3 and 6. This locking device includes a cam 35 which encircles shaft 32 and which is located within a cylindrical cam-receiving chamber 36 formed in a portion 37 of the frame, the wall of the cam-receiving chamber 36 being eccentric with respect to the center of the shaft 32. Cam 35 is provided with an operating handle 38 by means of which it may be revolved. By angularly moving handle 38 about the axis of shaft 32 cam 35 may be moved either into the position in which it is shown in Figure 6, in which position it is concentric with the cylindrical wall of the recess in which it is positioned, or can be revolved into a position of eccentricity relatively to the wall of the chamber in which it is housed, wedging itself against the wall and against shaft 32 and thus cramping the shaft or frictionally binding it against rotation.

The means for placing containers upon the conveyer at its left-hand end includes the vertically disposed container chute 40 which is rectangular in cross section and the lower forward wall of which is cut away to permit containers which have been dropped down the chute onto the container support 20 to be moved forwardly in the direction of the arrow A. In Figure 2 a container which has just been dropped through the chute and the bottom of which is resting upon the upper surface of the support 20, is indicated at $C^a$, and the conveyer includes mechanism for promptly thereafter pushing this container out of the chute and toward the means for continuing its motion toward the right, which means will be hereinafter described. The pusher for removing containers from the base of the chute may be most clearly perceived in Figures 1, 2 and 5 and comprises a container engaging plate 41 extending vertically, the lower end of this plate being fixed upon a slide 42 which may be reciprocated axially of the conveyer, slide 42 being movable along a trackway comprising parallel supporting rods 43, and the extent of movement being such that a container will be advanced from position $C^a$ to position $C^b$ when the pusher advances to the right, the pusher operating mechanism thereafter promptly returning the pusher to the position in which it is shown in Figures 2 and 5 so that the plate 41 will be in the rear of any further container which may be dropped through the chute. It will be observed from an inspection of Figures 1 and 5 that the plate 41 passes upwardly through a rectangular aperture or recess formed in the adjacent end of the container supporting member 20, the container bottom resting, during the time that it is within the sphere of action of the pusher, upon the two parallel portions 20' of the supporting member 20.

In its movement from position $C^a$ to position $C^b$ each successive container will not only be removed from the lower end of the chute 40 but will be placed in position to be engaged by the means for advancing it past the several instrumentalities 13, 14 and 15, previously referred to, and to the point of discharge at the right-hand end of the machine as shown in the drawings. This container advancing means includes three endless flexible elements 44, 45 and 46, these flexible elements preferably comprising chains, as shown, each chain being provided with a plurality of outwardly projecting pusher elements 47 and extending around, respectively, driving sprockets 48, 49 and 50 at one end of the machine and similar idler sprockets at the opposite end. The driving sprockets 48 and 50 are fixed on a vertical shaft 51 and driving sprocket 49 is fixed on vertical shaft 52, parallel to shaft 51. The ends of shafts 51 and 52 are suitably mounted in bearings and fixed upon these two shafts, adjacent the lower ends thereof, are the intermeshing gears 53 and 54, respectively, the shafts 51 and 52 being thereby constrained to rotate in unison, in opposite directions, and at the same angular velocity with the result that the three driving chains 44, 45 and 46 are caused to advance at the same linear velocity when the machine is in operation. Advancement of the containers is preferably intermittent and hence the driving means is of the intermittently operating or indexing type including a cam 55 fixed upon the horizontally disposed shaft 56 and the cam driven means including the cam followers 57 equidistantly spaced from each other and adapted to be successively engaged and advanced by cam 55 as the cam rotates at uniform velocity about the axis of shaft 56. Cam followers 57 are mounted upon the supporting plate 58 which in turn is rigidly connected to the horizontally disposed gear 59 by means of a connecting collar 60. Gear 59 is fixed upon the upper end of a supporting shaft 61 rotatably supported in a bearing 62 and the teeth of gear 59 are in constant mesh with the teeth of a pinion 63 fixed upon shaft 52, shaft 52 being thus intermittently driven or rotated by power derived from the drive shaft 56 through the intermittently operating driving or indexing mechanism just described, with the result that the associated shaft 51 is likewise intermittently rotated and the several conveyor chains 44, 45 and 46 intermittently and equally advanced. Any suitable indexing mechanism may be substituted for that described.

As clearly shown in Figures 1 and 3 the container pusher elements which project laterally from the conveyer chains are adapted to engage the rear panels of containers resting upon member 20 and moved by the pusher mechanism previously described into the position $C^b$, and to maintain contact with the rear panel or wall of such container until the container reaches the opposite or right-hand end of the machine, the charged and sealed container reaching the point of discharge being removed by an operator at that point. Each container is laterally guided between links of the parallel conveyer chains, links such for instance as shown at 64 having portions in close proximity to the lateral panels or side walls of the container at all times as it moves along the conveyer. In addition each container may be laterally guided by stationary guiding elements or blades, of which several are indicated in the drawings, at 65, 66, 67, 68, 69 and 70, respectively. These lateral stationary guides laterally confining the containers where it is necessary that the container occupy a precise predetermined position with relation to an instrumentality for acting upon its upper end, for instance, a closing or sealing mechanism. The other guides referred to are suitably supported upon stationary portions of the machine, guides 69 and 70, for instance, being supported upon the container supporting member 20. These guides will be vertically movable but the remainder will remain stationary.

In Figure 3 the container support 20 is shown in full lines at one position of adjustment and in dotted lines at a second position of adjustment. In the position in which it is shown in full lines the mechanism is adapted for the reception and transfer of relatively long containers, such for instance as quart-size containers. When member 20 is raised to its dotted line position (Figure 3) the mechanism is adjusted for the reception and transfer of containers of pint capacity. It may be further raised if desired, so that the mechanism is adjusted for the reception and transfer of half-pint containers, or even smaller containers. When containers of quart capacity are passing through the machine the pusher elements of the conveyer chains will engage the rear wall of each container at the top of the container side wall panel, just below the foldable top or upper end closure, as may be clearly perceived in Figure 3. As the upper conveyer chains 44 and 45 never change position it will be clear that each container passing through the machine, regardless of its height and capacity, will be engaged by the pusher members of these chains at the same point, it being important that the pushing forces be applied at the top of the container body where the top folding mechanism includes stationary cams which tend to resist the passage of containers during the top folding operation. The pusher associated with the lower conveyer chain 46 will engage large containers at approximately the midpoint of the body of each such container and will engage the base of a container of shorter size which rests upon member 20 when that member has been raised to the position of adjustment indicated in dotted lines. When member 20 is further raised, however, which is easily possible because at no time does it interfere with the movements of the container pushing elements of chain 46, these pushers become inoperative, but the pushers associated with chains 44 and 45 are entirely adequate in and of themselves in the advancement of containers of small size.

The means for oscillating the slide 42, and the container engaging plate 41 mounted thereon, may be varied as desired. In the drawings power derived from a constantly rotating cam 75 is transmitted to the slide through an oscillating arm 76 and linkage connecting the cam follower 77 and arm 76, the free end of the arm being slotted and a pin 78 mounted on the slide, working in this slot.

Naturally, in adapting the invention to the fabrication of containers which vary structurally minor changes may be made in the details of arrangement and design of the component elements of the conveyer, all without departure from the invention.

Having thus described the invention, what is claimed as new and desired to be secured by Letters Patent is:

1. In a container fabricating machine, a conveyer for transporting containers along a horizontal path and presenting the foldable upper ends thereof successively to mechanisms for charging, closing and sealing the same, said conveyer comprising an elongated relatively narrow horizontally disposed member for slidably supporting the bottoms of containers placed thereon, means for adjusting said member vertically so that the upper ends of containers of widely varying heights and capacities may be properly presented to said mechanisms, mechanism for successively placing containers upon said member, bottom end lowermost, and means for pushing containers so positioned on the supporting member intermittently in one direction along said member, said means including upper and lower endless chains, pusher elements projecting laterally from said chains to engage vertically spaced portions of the rear panel of each successive container body, the lower chain, and pushers carried thereby being positioned laterally of the path of vertical movement of the vertically adjustable elongated container supporting member so as to permit such member to be moved to positions above and below the lower chain, as desired.

2. The combination set forth in claim 1 in which two upper pusher-equipped endless chains and a single pusher-equipped lower endless chain are provided, the pushers of the upper chains being adapted to engage, respectively, the upper corners of the rear panels of containers to be closed, and the pushers of the lower chain being adapted to engage container rear panels either closely adjacent the lower ends thereof, or intermediate the upper and lower ends, depending upon the height of the containers resting upon said elongated member and the position of adjustment of said member.

CHARLES Z. MONROE.